(12) United States Patent
Schmidt

(10) Patent No.: US 6,732,427 B2
(45) Date of Patent: May 11, 2004

(54) METHOD FOR SHORTENING A CABLE PROBE

(75) Inventor: Robert Schmidt, Bifig (DE)

(73) Assignee: Endress + Hauser GmbH + Co., Maulburg (DE)

( * ) Notice: Subject to any disclaimer, the term of this patent is extended or adjusted under 35 U.S.C. 154(b) by 30 days.

(21) Appl. No.: 10/139,263

(22) Filed: May 7, 2002

(65) Prior Publication Data

US 2002/0124658 A1 Sep. 12, 2002

Related U.S. Application Data

(62) Division of application No. 09/749,747, filed on Dec. 28, 2000, now Pat. No. 6,414,242.

(30) Foreign Application Priority Data

Feb. 25, 2000  (DE) .......................................... 100 09 067

(51) Int. Cl.[7] .............................................. H01R 43/00
(52) U.S. Cl. ............................ 29/825; 29/593; 29/762; 29/764; 29/426.1
(58) Field of Search ............................ 174/74 R, 84 R, 174/74 A; 73/866.5; 52/146; 600/546; 29/825, 593, 762, 764, 426.1, 426.2, 857, 868, 876, 849; 324/538, 539

(56) References Cited

U.S. PATENT DOCUMENTS

| | | | | |
|---|---|---|---|---|
| 5,140,773 A | * | 8/1992 | Miwa et al. .................. | 451/41 |
| 5,391,839 A | * | 2/1995 | Lang et al. ................. | 174/65 R |
| 5,661,251 A | * | 8/1997 | Cummings et al. ......... | 73/866.5 |
| 5,827,985 A | * | 10/1998 | Grieger et al. .............. | 73/866.5 |
| 5,984,715 A | * | 11/1999 | Schmidt ...................... | 439/482 |
| 6,080,934 A | | 6/2000 | Schmidt et al. ............ | 174/74 R |

FOREIGN PATENT DOCUMENTS

| | | |
|---|---|---|
| DE | 1912681 | 3/1965 |
| DE | 29518916 U1 | 8/1996 |
| EP | 0857954 A1 | 8/1998 |

* cited by examiner

*Primary Examiner*—Carl J. Arbes
*Assistant Examiner*—Tai Nguyen
(74) *Attorney, Agent, or Firm*—Bacon & Thomas, PLLC; Felix J. D'Ambrosio

(57) ABSTRACT

A method for shortening a cable, which is mounted in a device housing of a measurement device, of a cable probe, comprising the step of: removing the measurement device electronics; interrupting the electrical connections between the measurement device electronics and the cable probe; releasing a built-in sleeve which surrounds the cable, as a result of which at least one seal which surrounds the cable and acts with respect to a medium to be measured, is relieved of load; drawing out of the device housing the built-in sleeve, together with the cable and the seal; shortening the cable by a desired length; once again drawing over the remaining cable of the cable probe, a seal, a built-in sleeve and clamping cone and mounting the cable in the built-in sleeve, by pulling it into said built-in sleeve; once again making the electrical connections between the cable probe and the measurement device electronics; and once again closing the device housing once the measurement device electronics have been fitted.

1 Claim, 6 Drawing Sheets

METHOD FOR SHORTENING A CABLE PROBE

This is a divisional of application Ser. No. 09/749,747, filed Dec. 28, 2000, now U.S. Pat. No. 6,414,242.

FIELD OF THE INVENTION

The invention relates to a measurement device having a cable probe, and to a method for shortening the cable of a cable probe.

BACKGROUND OF THE INVENTION

Various embodiments of measurement devices having cable probes are known, which normally comprise a housing in which measurement device electronics are accommodated, and to which a probe is fitted which is in the form of a cable, a bar or rod. For example, a capacitive measurement device is known from level measurement, in which at least one electrode (which is used for measurement) of the measurement capacitor is in the form of a cable or rod which is immersed in the medium to be measured. In a further measurement device for level measurement, electromagnetic pulses, for example, are transmitted on a waveguide, which is in the form of a rod or cable and is immersed in the medium to be measured, to the surface of the medium. A hydrostatic measurement device is also used for level measurement, in which a pressure sensor is mounted at the end of a cable and is lowered into the medium to be measured. All these probes which are in the form of cables, bars or rods and are connected to a measurement device, are referred to for the sake of simplicity, in the following text by the term "cable probes". The bars, rods or cables are accordingly referred to, for the sake of simplicity, as "cables".

The measurement devices having cable probes are normally mounted on a container which contains the medium to be measured, with the housing frequently being mounted in or on a container wall such that the cable probe projects into the interior of the container, and into the medium. The cable probes are either themselves electrically conductive, or have at least one electrical conductor in the interior, in the sense of electrical wires. The cables or the electrical conductors are normally connected to measurement device electronics in which the measurement signals are produced and processed. The measurement device electronics are in turn normally connected to an instrument or switching console or to some other higher-level unit, where the level measurements are processed.

A common feature of all these cable probes is that their length depends on the medium level expected or to be measured. If the cable probe needs to be shortened in response to changed measurement conditions, then, normally, the shortening of the cable and its processing, in particular its mounting, are problematic and difficult to carry out. A special tool is often required for this purpose, so that, in many cases, the work can be carried out only at the manufacturer's premises or supplier of the measurement device. Furthermore, with various devices, the electrical connection of the cable probe to the measurement device electronics is linked to the mechanical mounting of the cable in such a way that the cable probe cannot be shortened in a simple manner.

SUMMERY OF THE INVENTION

One object of the invention is thus to provide a measurement device having a cable probe, and a method according to which the cable probe can be shortened in a simple manner by an end user, to be precise if possible on site and without needing to use any special tools or other manufacturer-specific tools.

This object is achieved according to the invention by a measurement device
- having a device housing which accommodates measurement device electronics,
- having a cable probe mounted therein,
    - which comprises a built-in sleeve provided in the interior of the device housing,
    - which built-in sleeve can be fitted in or removed from the interior of the device housing by rotation about its longitudinal axis
    - and whose operating position is fixed by at least one detachable mounting.

One advantageous embodiment of the invention provides that the cable probe comprises a cable which is mounted in the built-in sleeve by means of a clamping cone which surrounds the cable.

In a further advantageous embodiment, the built-in sleeve is surrounded by a connecting sleeve of the device housing.

In another particularly advantageous embodiment of the measurement device according to the invention, the built-in housing has a mounting collar by means of which the built-in sleeve is mounted in its operating position in the device housing by means of a number of screws.

Even further embodiments of the invention provide that electrical conductors, which are located in the interior of the cable of the cable probe and are passed out in the built-in sleeve, are connected to a plug and/or to a plug connecting socket, in which the plug or the plug socket can be accommodated by the built-in sleeve.

Further advantageous embodiments of the measurement device according to the invention relate to a seal in an internal area of the connecting sleeve from a medium to be measured by means of a conical seal which is located in the interior of the connecting sleeve and surrounds the cable.

In other special embodiments of the invention, further seals are used in order to seal a part of the device housing which accommodates the measurement device electronics from an internal area of the connecting sleeve which accommodates the cable probe, and/or from an internal area of the built-in sleeve.

Furthermore, the invention achieves the object by means of a method for shortening a cable, which is mounted in a device housing of a measurement device, of a cable probe, comprising the following method steps:

a) after opening the device housing, the measurement device electronics are removed;

b) electrical connections between the measurement device electronics and the cable probe are interrupted;

c) releasing a built-in sleeve mounted on the housing side, which built-in sleeve surrounds the cable as a result of which at least one seal which surrounds the cable and acts with respect to the medium to be measured, is relieved of load in a connecting sleeve which also surrounds the cable of the cable probe;

d) the built-in sleeve is drawn out of the device housing, together with the cable and the seal;

e) the cable is shortened by a desired length;

f) a seal, a built-in sleeve and clamping cone are once again drawn over the remaining cable of the cable probe, and the cable is mounted in the built-in sleeve, by pulling it into said built-in sleeve;

g) the electrical connections between the cable probe and the measurement device electronics are made once again;

h) once the measurement device electronics have been fitted, the device housing is closed once again.

One particular advantage of the invention is that the only tools which are required to shorten the cable probe are a conventional screwdriver, pliers for cutting through and cutting off the cable of the cable probe, and/or a cutting tool like to a blade for exposing the electrical conductors contained therein.

A further advantage of the invention is that the cable of the cable probe can be shortened without the housing of the measurement device needing to be removed from a container which contains the medium to be measured.

The invention will be described and explained in the following text using an exemplary embodiment and with reference to the attached drawing. Identical features and parts of the various embodiments of the invention are provided with the same reference symbols, for simplicity. In the figures:

DETAILED DESCRIPTION OF PREFERRED AND ALTERNATIVE EMBODIMENTS

Figure 1:
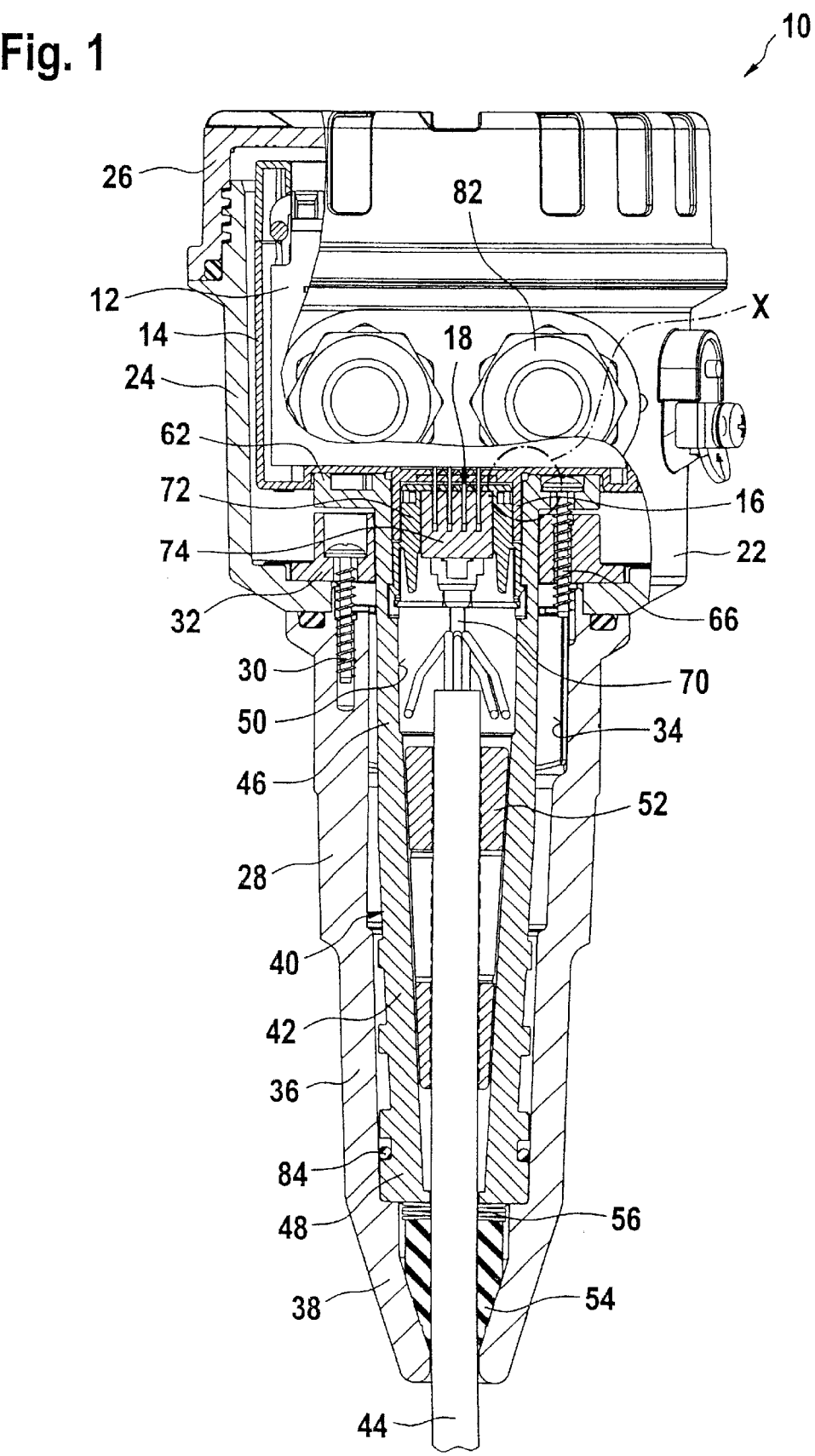
FIG. 1 shows an exemplary embodiment of a measurement device having a cable probe according to the invention with an essentially cut-open housing, showing a longitudinal section with details in the interior of the housing.
Figure 2:
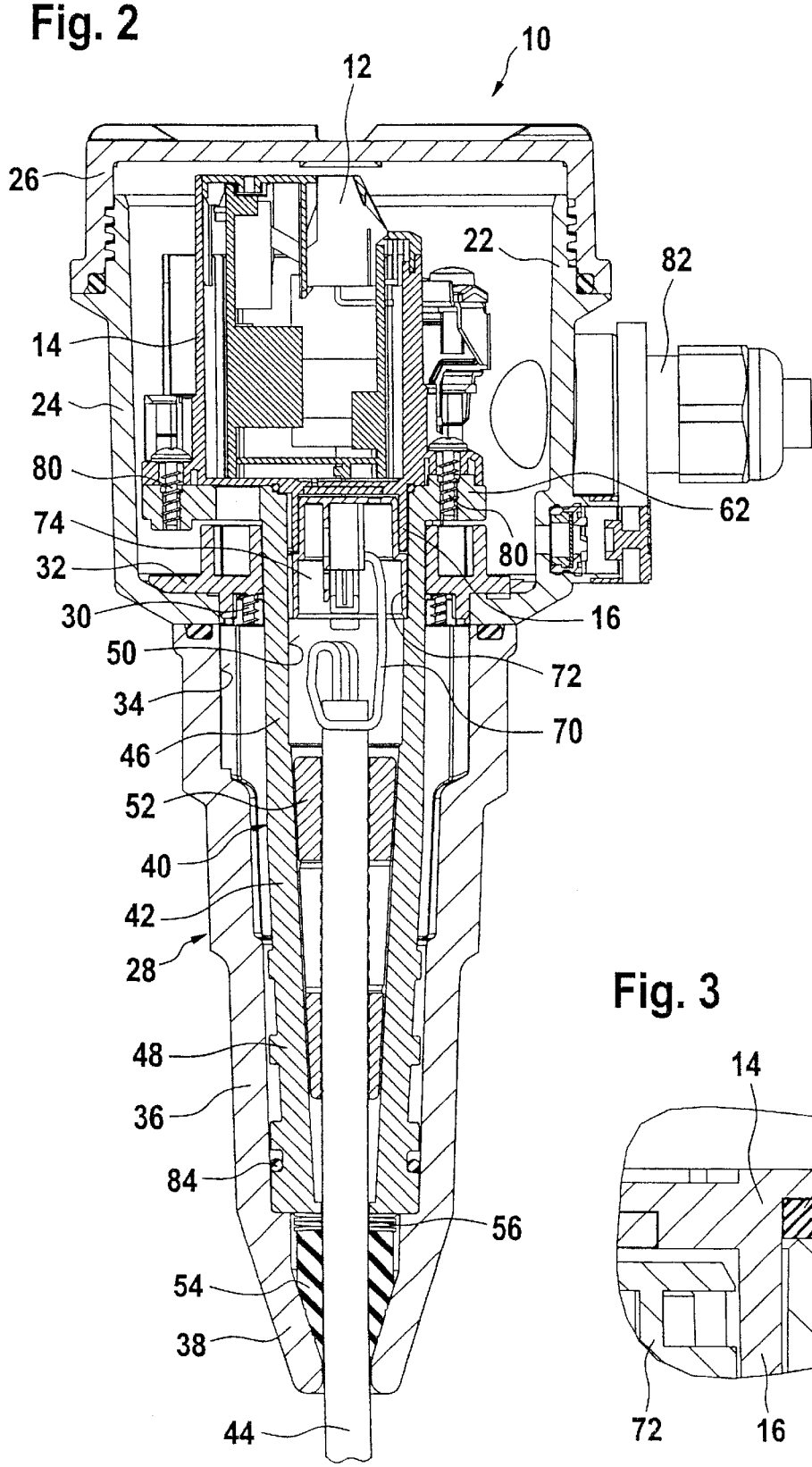
FIG. 2 shows the measurement device having the cable probe as shown in FIG. 1, in a longitudinal section rotated through 90° about a longitudinal axis in comparison to FIG. 1.

FIGS. 1 and 2 show a first exemplary embodiment of a measurement device 10 having a cable probe 40 according to the invention. The illustrated measurement device 10 may be, for example, a level measurement device which is known per se and is mounted on a container (which is not illustrated here) in such a way that the cable probe (40) is immersed in a medium whose level in the container is intended to be measured. Level measurement devices of the type illustrated here include, for example, those which allow the level to be determined capacitively or by measuring the hydrostatic pressure of the medium in the container by means of a differential pressure sensor, which is arranged at the end of the cable probe 40 but is not illustrated here. However, it is also feasible for the invention to be used with other measurement devices, in which the level is determined by means of electromechanical signals carried on the cable probe.

The measurement signals are converted by measurement device electronics 12, accommodated in the measurement device 10, into signals which correspond to the level, and are passed to a process control unit, for example an instrument console, which is not illustrated here. It is also feasible for the signals which correspond to the level to be carried on a data bus, which is not illustrated here but is connected to such a process control unit. Although the invention will be explained in the following text with reference to exemplary embodiments from level measurement, any type of measurement devices with cable probes is feasible for the invention.

An electronics housing, denoted by 14, which surrounds the measurement device electronics 12, is accommodated in a device housing 22 (which is illustrated partially cut open) of the measurement device 10, to be more precise in a housing pot 24. The housing pot 24 is closed by a cover 26. The housing pot 24 has a connecting sleeve 28 arranged on it, which either forms an integral unit with the housing pot 24 or, as shown in FIGS. 1 and 2, is mounted on the housing pot 24, for example by means of screws 30, which mount the connecting sleeve 28 on a mounting apparatus 32 provided in the housing pot 24.

The connecting sleeve 28 has a central opening 34 which accommodates a built-in sleeve 42, in whose central opening 50 a cable 44 of the cable probe 40 is mounted. The built-in sleeve 42 for this purpose preferably comprises a virtually cylindrical part 46 and a conical part 48, with the cable 44 being mounted in the continuous central opening 50 by means of a clamping cone 52, by being clamped in a self-retaining manner in an appropriately designed conical region of the central opening 50 of the built-in sleeve 42, as is shown in FIGS. 1 and 2. A lower part 36 of the connecting sleeve 28 merges into a tip 38, with the unobstructed internal diameter of its central opening 34 being reduced continuously down to approximately the external diameter of the cable 44 in this region, to be more precise in the interior of the tip 38. A sealing cone 54, preferably composed of elastomer material, is provided here, surrounds the cable 44 forming a seal, and also seals the interior of the connecting sleeve 28, that is to say its central opening 34. Furthermore, as shown in FIGS. 1 and 2, a plate-spring gland 56 is provided in the interior of the connecting sleeve 28, between the built-in sleeve 42 and the sealing cone 54, and is supported on one side on the sealing cone 54 while on the other side, as will be explained later, allowing a removal of the built-in sleeve 42.

Figure 7:
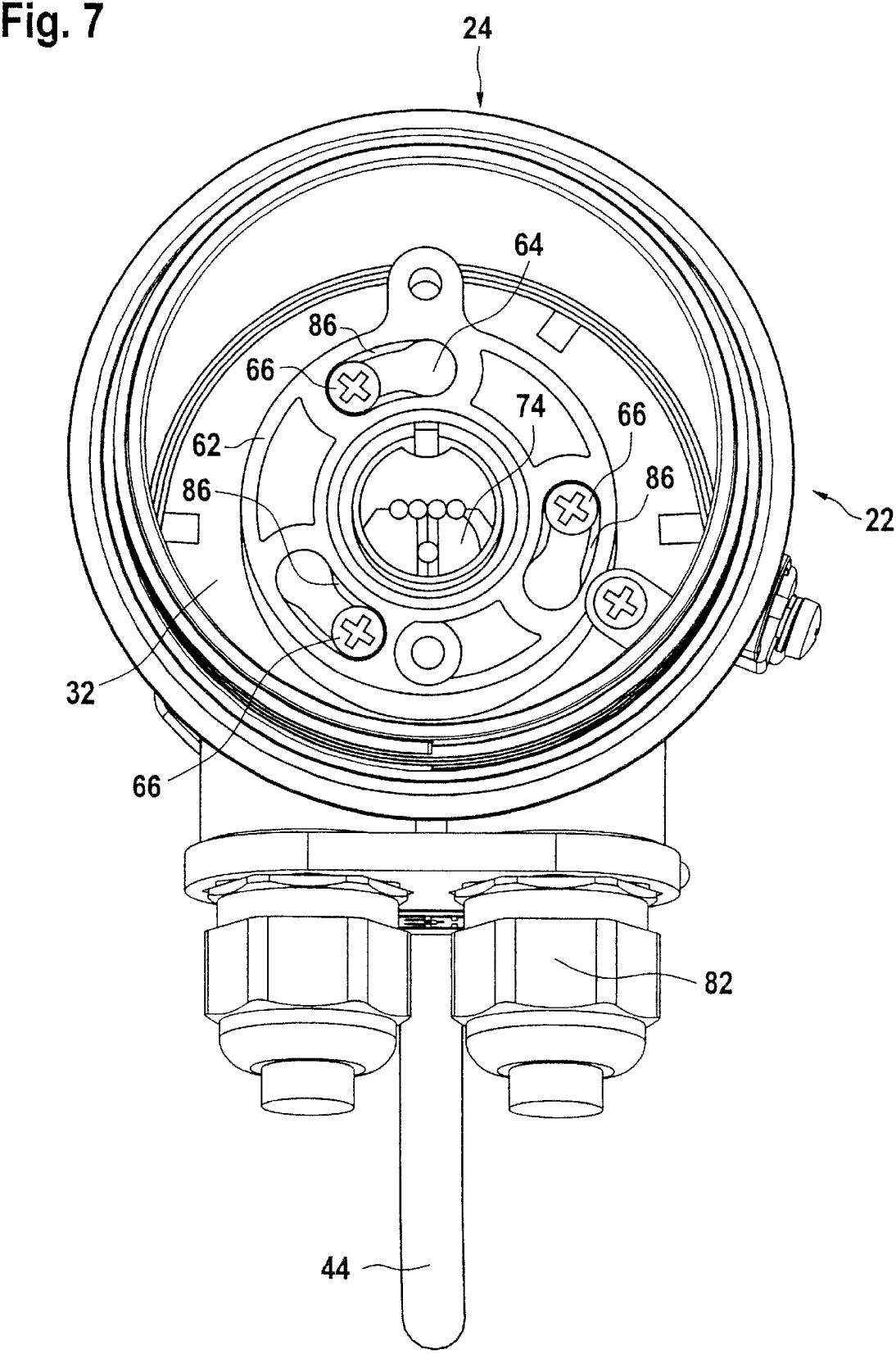
FIG. 7 shows a perspective view of the interior of the housing of the measurement device shown in FIG. 1, after the cable probe has been fitted.

A mounting collar 62 is fitted on that end of the built-in sleeve 42 which, as illustrated in FIGS. 1 and 2, projects beyond the connecting sleeve 28 into the housing pot 24, and this mounting collar 62 projects outward beyond the virtually cylindrical part 46 of the built-in sleeve 42. The built-in sleeve 42, and thus the cable probe 40, are held and fixed in their operating position by means of screws 66, which are passed through screw bushings 64 in the mounting collar 62 and are anchored in the mounting apparatus 32 in the device housing 22. The screws 66 are, for example, conventional slot-headed screws, preferably with a cruciform-slotted head, as illustrated in FIG. 7.

Furthermore, FIGS. 1 and 2 illustrate electrical conductors 70 of the cable probe 40, which are arranged in the interior of the cable 44. These electrical conductors 70 are exposed above the clamping cone 52 and are electrically connected in a desired manner to a plug connecting socket 72. The plug connecting socket 72 is accommodated in a plug insert 74, which is accommodated by the central opening 50 of the built-in sleeve 42 and is held in the region of the mounting apparatus 32. Suitable plug pins 18 are fitted on the electronics housing 14 and are surrounded by a plug container 16. When the measurement device electronics 12 are being fitted in the housing pot 24, the plug pins 18 are inserted into the plug connecting socket 72, thus producing an electrical connection between the electrical conductors 70 and the measurement device electronics 12. Suitable guides are provided for correct positioning of the plug pins 18 on the plug container 16 and on the plug connecting socket 72, and these allow the plug pins 18 to be located only in a desired and preferred position.

Since the illustration chosen in FIG. 2 shows a longitudinal section rotated through 90° about the longitudinal axis from the illustration in FIG. 1, FIG. 2 shows two fastening screws 80 in addition to those shown in FIG. 1, by means of which the electronics housing 14, and thus the measurement device electronics 12, is mounted in its position in the housing pot. The fastening screws 80 are preferably of the same commercially available type as the screws 66, for example screws with a cruciform-slotted head. For completeness, FIGS. 1 and 2 also show cable bushings 82, through which cables are passed out of the device housing 22, in order to connect the measurement device electronics 12 to the instrument console.

Figure 3:
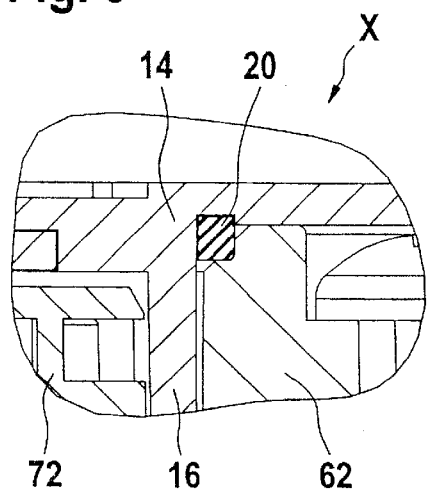
FIG. 3 shows a detail X of the measurement device shown in FIG. 1, corresponding to the marking there.
Figure 8:
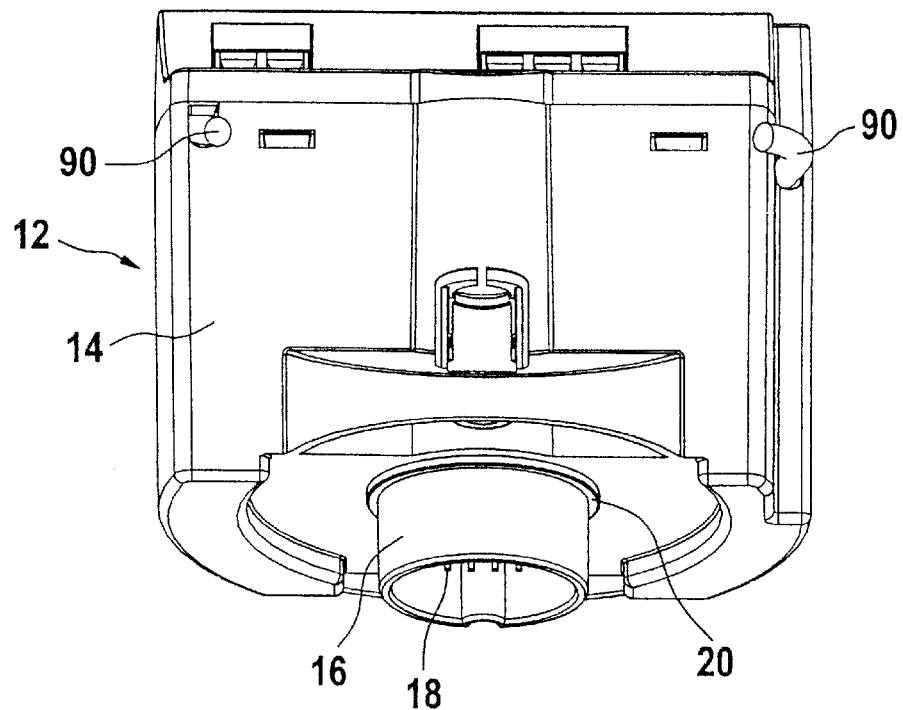
FIG. 8 shows a perspective front view of the measurement device electronics.
Figure 9:
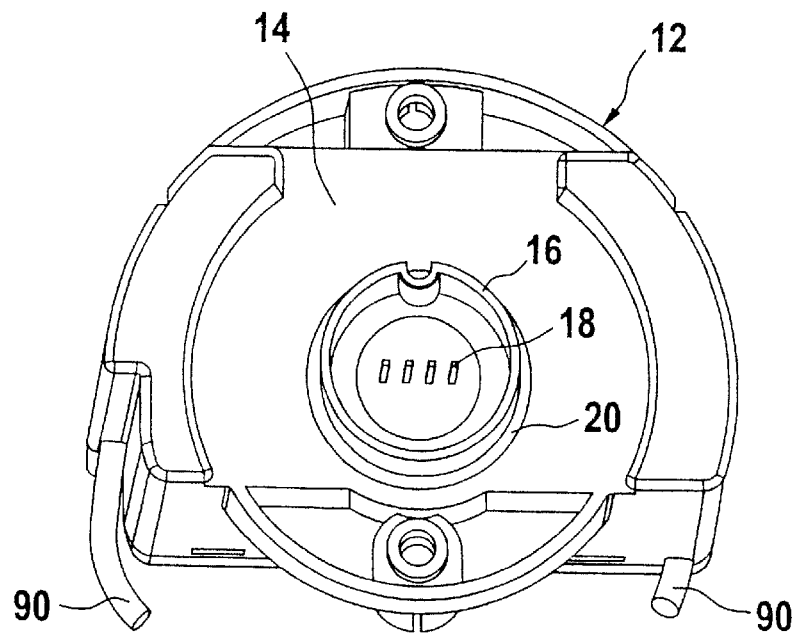
FIG. 9 shows a perspective view of the measurement device electronics shown in FIG. 9, from underneath.

FIG. 3 shows a detail X from FIG. 1. As a special configuration of the measurement device 10, this figure illustrates a first elastomer seal 20, which seals an intermediate area between the plug container 16 of the electronics housing 14 and the mounting collar 62 of the built-in sleeve 42. This first elastomer seal 20 can be fitted on to an appropriate sealing seat in the built-in sleeve 42. The first elastomer seal 20 is, however, preferably fitted to the plug container 16, as is illustrated in FIGS. 8 and 9. In this case, for the sake of simplicity, it can be sprayed on. Together with second elastomer seal 84, which is provided on the conical part 48 of the built-in sleeve 42 and is illustrated in FIGS. 1 and 2, the first elastomer seal 20 ensures that the measurement device 10—for the theoretical situation where the cable 44 is torn off during operation—satisfies even the most stringent possible requirements with regard to absolute sealing from the medium, and any other influences from the container. The two elastomer seals ensure that the housing pot 24 which accommodates the measurement device electronics 12 is in all situations sealed both from the internal area, that is to say from the central opening 34 of the connecting sleeve 28, and from the internal area, that is to say from the central opening 50 of the built-in sleeve 42. It is evident that the elastomer seals 20 and 84 are used only in those situations where a licensing authority places relatively stringent requirements on sealing from the medium. In most conventional applications, the seals 20 and 84 are thus not required.

Figure 4:
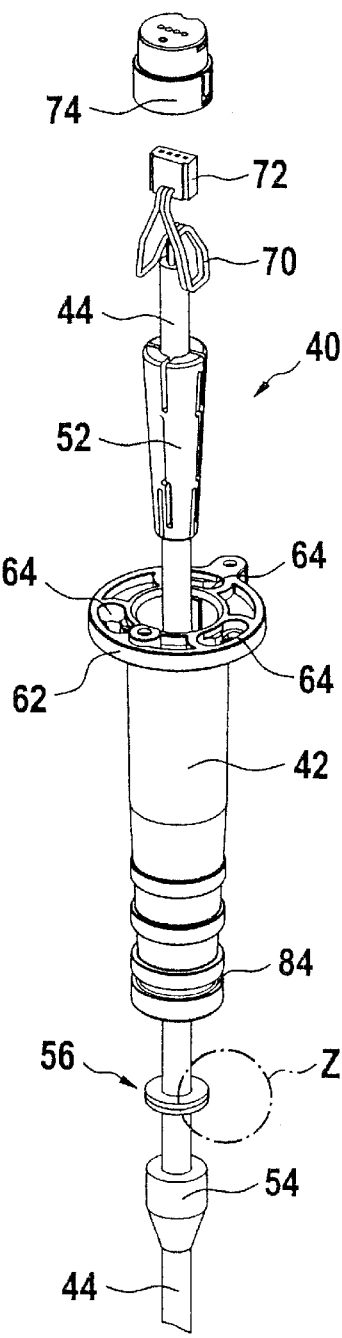
FIG. 4 shows a perspective view of the cable probe of the measurement device shown in FIG. 1, with the individual parts shown in an exploded view.
Figure 5:
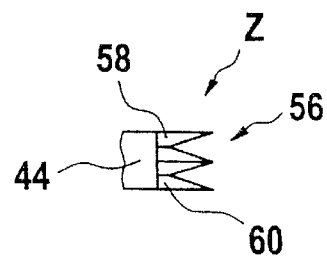
FIG. 5 shows a detail Z of the measurement device shown in FIG. 4, corresponding to the marking there.

FIG. 4 shows the cable probe 40 in the removed state and without the surrounding connecting sleeve 28. This clearly shows how the sealing cone 54 surrounds the cable 44 forming a seal. The plate-spring gland 56 is pushed over the cable 44 between the sealing cone 54 and the built-in sleeve 42, and its layers are shown in more detail in FIG. 5. It is evident from this that the individual plate springs are as far as possible arranged on one another in opposite senses in order that they allow the greatest possible travel when relieved of load. A plate spring 58, which is referred to here as the "topmost" corresponding to the chosen illustration, and a plate spring 60 which is accordingly referred to as the "bottom most", are each arranged with their broad contact surface facing the built-in sleeve 42 and the sealing cone 54, respectively.

FIG. 4 also shows the construction of the mounting collar 62 of the built-in sleeve 42. The screw bushings 64, preferably three, are in the form of elongated holes and allow the fastening screws 66 to be passed through, or allow the mounting collar 62 to be placed over screws 66 which have already been fastened in the device housing 22 (in this context, see FIG. 1, 2 or 7). The screw bushings 64 preferably each internally have contact surfaces 86 against which the screw heads can rest in order thus to secure the built-in sleeve 42 when the screws 66 are tightened, as illustrated in FIG. 7. For this purpose, as mentioned, the mounting collar 62 is normally placed over the screws 66 and is rotated about the central longitudinal axis of the built-in sleeve 42. In a similar way to the so-called bayonet fitting, the screws 66 are guided in the screw bushings 64 and limit the rotary movement. Once the screws 66 have reached the desired position with respect to the cut surfaces 86 (see FIG. 7) they are tightened.

The clamping cone 52 shown in FIG. 4 is arranged above the built-in sleeve 42 on the cable 44. The electrical conductors 70 of the cable 44 can likewise be seen, and have had the insulation which surrounds them removed above the clamping cone 52 so that they open into the plug connecting socket 72, where they are connected to the respectively desired connecting contacts.

By pulling the cable 44 in the direction indicated by an arrow 88, it is pulled with the clamping cone 52 into the built-in sleeve 42, and is firmly clamped there. Any gap between the clamping cone 52 and the plug connecting socket 72 has in this case been selected such that the plug connecting socket 72 and the plug insert 74 surrounding it are accommodated by the built-in sleeve 42, as already shown in FIGS. 1 and 2, in which case a certain length in the form of safety loops should be provided for the electrical conductors 70. Once the clamping cone 52 has been pulled (with the cable 44) into the built-in sleeve 42, the plate-spring gland 56 is pushed together with the sealing cone 54 against the built-in sleeve 42, forming a seal, as in shown in FIG. 6. However, this procedure is not necessary in every case. Normally, it may be sufficient to pull on the cable 44 outside the connecting sleeve 28, in order in this way to pull the sealing cone 54, the plate-spring gland 56 and the built-in sleeve 42, together with the clamping cone 52 clamped in it, into the connecting sleeve 28.

Together with the plug connecting socket 72 in the plug insert 74, the cable 44 located in the built-in sleeve 42 and secured by means of the clamping cone 52, and together with a sensor mounted thereon, not illustrated here, the built-in sleeve 42 forms the unit which is referred to above as the cable probe 40. In a view into the interior of the housing pot 24 of the device housing 22, FIG. 7 shows the cable probe 40 mounted there, once the cable probe 40, to be more precise its built-in sleeve 42, has been pulled into the housing pot 24 and the connecting sleeve 28, and has been secured in the desired position there by means of the screws 66.

Once the measurement device electronics 12 in the electronics housing 14 have been fitted into the housing pot 24 and onto the mounting collar 64 such that the plug pins 18 on the electronics housing 14 engage in the plug connecting socket 72, the electronics housing 14 is secured in its position in the housing pot 24 by means of the screws 80 (in this context, see also FIG. 2). Once the connecting cables 90 have been passed through the cable bushings 82 to the instrument console, the device housing 22 is closed by the cover 26 illustrated in FIG. 6. As already described above, this situation is illustrated in FIGS. 1 and 2.

FIGS. 8 and 9 once again show the electronics housing 14, which accommodates the measurement device electronics 12. The plug container 16 which surrounds the plug pins 18 is shown here. This plug container 16 on the one hand protects the plug pins 18, and on the other hand, by virtue of its special shape with a type of guide tab, ensures that it and thus the electronics housing 14 can be fitted onto the built-in sleeve 42 in only one, desired, correct position. Said guide tab for this purpose engages in a corresponding recess in the plug insert 74 (in this context, see FIGS. 4 and 7), thus ensuring that this is the only way in which the electronics housing 40 can be accommodated completely by the housing pot 24, and that the latter can be closed by the cover 26 (in this context, see FIGS. 1 and 2).

This also clearly shows the already mentioned first elastomer seal 20, which is provided in the bottom of the plug container 16 on the electronics housing 14 and allows the measurement device 10 having the cable probe 40 according to the invention to satisfy even relatively stringent requirements for sealing. In their base on the electronics housing 14, the plug pins 18 are preferably also extrusion coated with a thin layer of elastomer material, so that the point where they pass through the electronics housing 14 is also reliably sealed. For simplicity, the connecting cables 90 are only indicated in FIGS. 8 and 9.

So far, the advantageous construction and assembly of the measurement device 10 with the cable probe 40 according to the invention has been explained. One particular advantage of the invention is, however, that it allows the cable 44 to be shortened in a simple way. Once the cover 26 has been loosened and removed from the device housing 22, the connecting cables 90 are released, and the fastening screws 80 are completely released by means of a conventional screwdriver. The measurement device electronics 12 which are accommodated in the electronics housing 14 are then pulled off the built-in sleeve 42, and the plug connection to the plug connecting socket 72 of the cable probe 40 is disconnected. Once the measurement device electronics 12 have been removed from the device housing 22, this results in the view illustrated in FIG. 7. There is no need to remove or disassemble the measurement device 10 from a container on which it is mounted.

Figure 6:
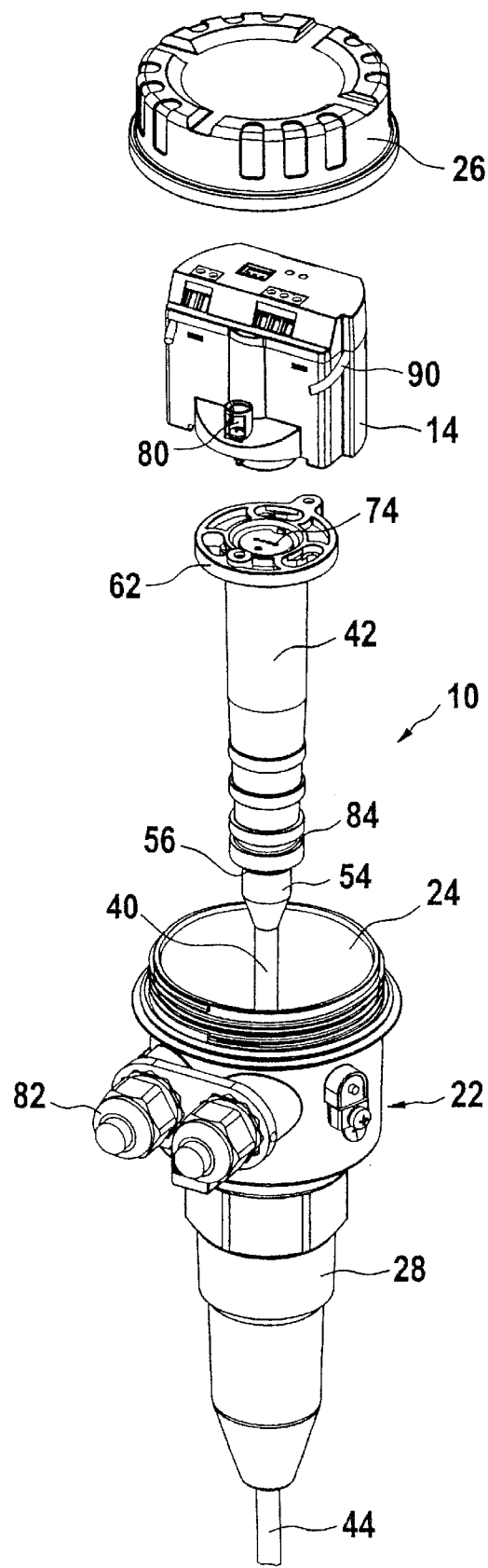
FIG. 6 shows a perspective view of the individual parts of the measurement device shown in FIG. 1.

Loosening the screws 66 results in the load on the plate-spring gland 56, which is subject to spring stress, being relieved, and the built-in sleeve 42 is pushed out of its previous seat. The special shape of the screw bushings 64 with the contacts 86 (in this context see FIG. 7) limits the travel of the built-in sleeve 42. Further loosening of the screws 66, but without having to remove them completely from their seat, allows slight rotation of the built-in sleeve 42, and thus of the cable probe 40, about its longitudinal axis, to be precise to such an extent that the cable probe 40 can be raised above the screws 66 and can be pulled out of the device housing 22, as is illustrated in FIG. 6.

There are now two possible ways to shorten the cable 44. The built-in sleeve 42, the clamping cone 52 as well as the plate-spring gland 56 and the sealing cone 54 may or may not be reused.

In the second case, which is that which will probably occur more frequently in practice, the cable probe 40 is pulled out of the device housing 22 by somewhat more than the desired shortening length, and the cable is cut through as appropriate, preferably using a conventional tool. Then, and after removing the previous built-in sleeve 42 and the previous sealing cone 54, a new sealing cone 54, a new plate-spring gland 56, a new built-in sleeve 42 and a new clamping cone 52 are pushed over the shortened cable 44. The electrical conductors 70 of the cable 44 are exposed, their insulation is removed, and they are connected to a new plug connecting socket 72, as is shown in FIG. 4. If a mesh of steel wires is used for reinforcement or shielding in the cable 44, then it is self-evident that this mesh must likewise be correspondingly shortened. Once a new plug insert 74 has been fitted onto the plug connecting socket 72, the clamping cone 42, together with the plate-spring gland 56 and the sealing cone 54, is pulled into the device housing 22 once again, and the built-in sleeve is pushed over the screws 66. After a slight rotary movement, the screws 66 can be tightened, and the measurement device electronics 12 can be fitted. Once the electronics housing has been mounted in the desired position and the connecting cables 90 have been connected, the device housing 22 can be closed by the cover 26 once again and, in principle, is ready for renewed operation.

As is provided in the first case, mentioned above, for shortening the cable 44, the sealing cone 54, the plate-spring gland 56, the built-in sleeve 42, the clamping cone 52 as well as the plug connecting socket 72 and the plug insert 74 can also, of course, be reused. In each of the two described cases, the invention allows the cable 44 of the cable probe 40 to be shortened in a simple manner, to be precise in the field, and by using a normal tool which people there carry with them daily.

What is claimed is:

1. A method for shortening a cable, which is mounted in a device housing of a measurement device, of a cable probe, comprising the steps of:

a) removing the measurement device electronics after opening the device housing;

b) interrupting the electrical connections between the measurement device electronics and the cable probe;

c) releasing a built-in sleeve which surrounds the cable, as a result of which at least one seal which surrounds the cable and acts with respect to a medium to be measured, is relieved of load;

d) drawing out of the device housing the built-in sleeve, together with the cable and the seal;

e) shortening the cable by a desired length;

f) once again drawing over the remaining cable of the cable probe, a seal, a built-in sleeve and clamping cone and mounting the cable in the built-in sleeve, by pulling it into said built-in sleeve;

g) once again making the electrical connections between the cable probe and the measurement device electronics; and h) once again closing the device housing once the measurement device electronics have been fitted.

* * * * *